(12) United States Patent
Fong et al.

(10) Patent No.: US 8,254,358 B2
(45) Date of Patent: Aug. 28, 2012

(54) COMMUNICATING A BROADCAST MESSAGE TO CHANGE DATA RATES OF MOBILE STATIONS

(75) Inventors: Mo-Han Fong, L'Orignal (CA); Jun Li, Richardson, TX (US); Sophie S. Vrzic, Nepean (CA); Ali Iraqi, Kanata (CA)

(73) Assignee: Ericsson AB, Stockholm (SE)

( * ) Notice: Subject to any disclaimer, the term of this patent is extended or adjusted under 35 U.S.C. 154(b) by 2436 days.

(21) Appl. No.: 10/799,963

(22) Filed: Mar. 12, 2004

(65) Prior Publication Data

US 2004/0246930 A1 Dec. 9, 2004

Related U.S. Application Data

(63) Continuation-in-part of application No. 10/793,056, filed on Mar. 4, 2004.

(60) Provisional application No. 60/452,370, filed on Mar. 6, 2003, provisional application No. 60/454,714, filed on Mar. 15, 2003, provisional application No. 60/457,215, filed on Mar. 25, 2003, provisional application No. 60/459,534, filed on Apr. 1, 2003, provisional application No. 60/462,220, filed on Apr. 11, 2003, provisional application No. 60/468,442, filed on May 6, 2003, provisional application No. 60/469,106, filed on May 9, 2003, provisional application No. 60/469,778, filed on May 12, 2003, provisional application No. 60/475,440, filed on Jun. 3, 2003, provisional application No. 60/478,792, filed on Jun. 16, 2003, provisional application No. 60/495,544, filed on Aug. 15, 2003, provisional application No. 60/499,584, filed on Sep. 2, 2003.

(51) Int. Cl.
*H04B 7/216* (2006.01)

(52) U.S. Cl. ........ 370/342; 370/318; 370/468; 370/493; 370/335; 455/69; 455/422.1; 455/468; 455/522; 455/450; 375/209

(58) Field of Classification Search ................ 370/335, 370/209, 220, 493, 468, 342; 455/69, 453, 455/452.2, 468, 422, 450, 522
See application file for complete search history.

(56) References Cited

U.S. PATENT DOCUMENTS

| 5,383,219 A | 1/1995 | Wheatley et al. |
| 5,528,593 A | 6/1996 | DeJaco |

(Continued)

FOREIGN PATENT DOCUMENTS

EP 0715431 6/1996

(Continued)

OTHER PUBLICATIONS

Young C. Yoon, Anthony C.K. Soong, S. Shawn Tsai, "Reverse Link Enhancements for CDMA2000 1× Revision D (E-REX) R2," 3rd Generation Partnership Project 2 "3GPP2", 3GPP2-C30-20030818-012, Aug. 2003, 38 pages.

(Continued)

*Primary Examiner* — Amancio Gonzalez
(74) *Attorney, Agent, or Firm* — Coats & Bennett, PLLC

(57) ABSTRACT

A wireless communications network includes a base station to communicate with plural mobile stations over a wireless link. A broadcast message is sent to the plural mobile stations, with the broadcast message containing an indication for indicating to the plural mobile stations that the mobile stations are to change data rates for transmissions over a reverse wireless link.

25 Claims, 3 Drawing Sheets

U.S. PATENT DOCUMENTS

| | | | |
|---|---|---|---|
| 5,535,239 | A | 7/1996 | Padovani et al. |
| 5,603,096 | A | 2/1997 | Gilhousen et al. |
| 5,745,480 | A | 4/1998 | Behtash et al. |
| 5,771,226 | A | 6/1998 | Kaku |
| 5,809,061 | A | 9/1998 | Shea et al. |
| 5,812,938 | A | 9/1998 | Gilhousen et al. |
| 5,859,838 | A | 1/1999 | Soliman |
| 5,872,775 | A | 2/1999 | Saints et al. |
| 5,914,950 | A | 6/1999 | Tiedemann, Jr. et al. |
| 5,926,500 | A | 7/1999 | Odenwalder |
| 5,943,316 | A | 8/1999 | Davis |
| 5,946,356 | A | 8/1999 | Felix |
| 5,949,790 | A | 9/1999 | Pehkonen et al. |
| 5,982,760 | A | 11/1999 | Chen |
| 5,982,766 | A | 11/1999 | Nystrom et al. |
| 5,982,813 | A | 11/1999 | Dutta et al. |
| 6,067,458 | A | 5/2000 | Chen |
| 6,134,220 | A | 10/2000 | Delprat |
| 6,137,840 | A | 10/2000 | Tiedemann et al. |
| 6,219,343 | B1 | 4/2001 | Honkasalo et al. |
| 6,252,898 | B1* | 6/2001 | Eto et al. ............... 375/130 |
| 6,377,814 | B1 | 4/2002 | Bender |
| 6,393,276 | B1 | 5/2002 | Vanghi |
| 6,397,070 | B1 | 5/2002 | Black |
| 6,400,960 | B1 | 6/2002 | Dominique et al. |
| 6,438,119 | B1 | 8/2002 | Kim et al. |
| 6,456,604 | B1 | 9/2002 | Lee et al. |
| 6,477,502 | B1 | 11/2002 | DeJaco |
| 6,480,472 | B1 | 11/2002 | Jou et al. |
| 6,490,460 | B1 | 12/2002 | Soliman |
| 6,549,542 | B1 | 4/2003 | Dong et al. |
| 6,587,447 | B1 | 7/2003 | Wang et al. |
| 6,643,272 | B1 | 11/2003 | Moon et al. |
| 6,654,613 | B1 | 11/2003 | Maeng et al. |
| 6,671,266 | B1 | 12/2003 | Moon et al. |
| 6,724,740 | B1 | 4/2004 | Choi et al. |
| 6,728,551 | B2 | 4/2004 | Chang |
| 6,731,606 | B2 | 5/2004 | Lin et al. |
| 6,731,948 | B1 | 5/2004 | Lee et al. |
| 6,741,862 | B2 | 5/2004 | Chung et al. |
| 6,760,576 | B2* | 7/2004 | Chen ............... 455/266 |
| 6,782,035 | B1 | 8/2004 | Nakamura et al. |
| 6,782,269 | B2* | 8/2004 | Toskala et al. ............... 455/509 |
| 6,798,774 | B1 | 9/2004 | O'Connor |
| 6,804,530 | B2 | 10/2004 | Chheda et al. |
| 6,831,910 | B1 | 12/2004 | Moon et al. |
| 6,917,607 | B1 | 7/2005 | Yeom et al. |
| 6,950,632 | B1 | 9/2005 | Yun et al. |
| 6,975,604 | B1 | 12/2005 | Ishida et al. |
| 6,983,166 | B2 | 1/2006 | Shiu et al. |
| 6,999,425 | B2 | 2/2006 | Cheng et al. |
| 7,031,741 | B2 | 4/2006 | Lee et al. |
| 7,054,275 | B2 | 5/2006 | Kim et al. |
| 7,054,282 | B2 | 5/2006 | Proctor et al. |
| 7,054,656 | B2 | 5/2006 | Zhou et al. |
| 7,068,683 | B1* | 6/2006 | Lundby et al. ............... 370/493 |
| 7,069,033 | B1 | 6/2006 | Moon et al. |
| 7,072,306 | B2 | 7/2006 | Blessent |
| 7,110,785 | B1 | 9/2006 | Paranchych et al. |
| 7,120,134 | B2 | 10/2006 | Tiedemann et al. |
| 7,127,654 | B2 | 10/2006 | Jalali et al. |
| 7,142,865 | B2 | 11/2006 | Tsai et al. |
| 7,155,236 | B2* | 12/2006 | Chen et al. ............... 455/454 |
| 7,158,796 | B2 | 1/2007 | Tiedemann et al. |
| 7,190,964 | B2 | 3/2007 | Damnjanovic et al. |
| 7,221,653 | B2 | 5/2007 | Vanghi |
| 7,346,314 | B2 | 3/2008 | Tsai et al. |
| 2001/0017848 | A1 | 8/2001 | Tiedemann |
| 2002/0093918 | A1 | 7/2002 | Kim et al. |
| 2002/0110101 | A1 | 8/2002 | Gopalakrishnan |
| 2002/0141349 | A1 | 10/2002 | Kim et al. |
| 2002/0172217 | A1* | 11/2002 | Kadaba et al. ............... 370/443 |
| 2002/0181410 | A1* | 12/2002 | Bae et al. ............... 370/252 |
| 2002/0183066 | A1 | 12/2002 | Pankaj |
| 2003/0026219 | A1 | 2/2003 | Moon et al. |
| 2003/0050084 | A1 | 3/2003 | Damnjanovic et al. |
| 2003/0060203 | A1* | 3/2003 | Ahn ............... 455/445 |
| 2003/0067899 | A9 | 4/2003 | Chen et al. |
| 2003/0073443 | A1 | 4/2003 | Bae et al. |
| 2003/0078010 | A1 | 4/2003 | Davis |
| 2003/0083093 | A1 | 5/2003 | Yun et al. |
| 2003/0086397 | A1 | 5/2003 | Chen |
| 2003/0117969 | A1 | 6/2003 | Koo et al. |
| 2003/0125037 | A1 | 7/2003 | Bae et al. |
| 2003/0130002 | A1 | 7/2003 | Chen et al. |
| 2003/0133409 | A1 | 7/2003 | Corazza |
| 2003/0142768 | A1 | 7/2003 | Sintonen |
| 2003/0179704 | A1 | 9/2003 | Lakkakorpi |
| 2004/0013103 | A1 | 1/2004 | Zhang et al. |
| 2004/0029604 | A1 | 2/2004 | Raaf |
| 2004/0160914 | A1 | 8/2004 | Sarkar |
| 2004/0162098 | A1 | 8/2004 | Wei et al. |
| 2004/0179525 | A1 | 9/2004 | Balasubramanian et al. |
| 2004/0202136 | A1 | 10/2004 | Attar et al. |
| 2004/0223455 | A1 | 11/2004 | Fong et al. |
| 2004/0252669 | A1 | 12/2004 | Hosein |
| 2004/0258096 | A1 | 12/2004 | Yoon et al. |
| 2005/0025077 | A1 | 2/2005 | Balasubramanian et al. |
| 2005/0078629 | A1 | 4/2005 | Bi et al. |
| 2005/0105604 | A1 | 5/2005 | Ito et al. |
| 2005/0107090 | A1* | 5/2005 | Hosein ............... 455/453 |

FOREIGN PATENT DOCUMENTS

| | | |
|---|---|---|
| EP | 1231807 | 8/2002 |
| EP | 1246384 | 10/2002 |
| WO | WO 00/07401 | 2/2000 |
| WO | WO 00/72609 | 11/2000 |
| WO | WO0074289 A | 12/2000 |
| WO | WO0137443 | 5/2001 |
| WO | WO 01/89257 | 11/2001 |
| WO | WO0235735 | 5/2002 |
| WO | WO2004045239 | 5/2004 |

OTHER PUBLICATIONS

Edward G. Tiedemann, Jr., Chair TSG-C WG3, "A Harmonized Reverse Link," 3rd Generation Partnership Project 2 "3GPP2", 3GPP2-C30-20030818-085, Aug. 19, 2003, 10 pages.

Patrick Hosein, Tao Wu, Young C. Yoon, S. Shawn Tsai, Anthony C.K. Soong, "E-REX Reverse Link Per Sector Rate Control Algorithm and Performance,"3rd Generation Partnership Project 2 "3GPP2", 3GPP2-C3-20030714-015, Jul. 2003, 6 pages.

Tao Wu, Patrick Hosein, Anthony C.K. Soong, "RL Common Rate Control Performance Results with Different Number of Rate Control Bits," 3rd Generation Partnership Project 2 "3GPP2", 3GPP2-C30-20030915-010, Sep. 2003, 5 pages.

Rath Vannithamby, Tao Wu, Patrick Hosein, Anthony C.K. Soong, "Reverse Link Common Rate Control Mechanism," 3rd Generation Partnership Project 2 "3GPP2", 3GPP2-C21-20030915-0XX, Sep. 2003, 4 pages.

Tao Wu, Patrick Hosein, Anthony C.K. Soong, "Ericsson Common Rate Control Algorithm Performance," 3rd Generation Partnership Project 2 "3GPP2", 3GPP2-C30-20030930-010, Oct. 2003, 6 pages.

IDS submitted Oct. 8, 2004 for U.S. Appl. No. 10/718,939.
Supplemental IDS submitted Aug. 25, 2005 for U.S. Appl. No. 10/718,939.
Office Action mailed Apr. 30, 2007 for U.S. Appl. No. 10/718,939.
Final Office Action mailed Sep. 27, 2007 for U.S. Appl. No. 10/718,939.
Advisory Action dated Dec. 20, 2007 for U.S. Appl. No. 10/718,939.
Office Action dated Apr. 2, 2008 for U.S. Appl. No. 10/718,939.
Office Action dated Aug. 20, 2008 for U.S. Appl. No. 10/718,939.
Office Action dated Feb. 6, 2009 for U.S. Appl. No. 10/718,939.
Office Action dated Dec. 12, 2007 for U.S. Appl. No. 10/723,805.
Office Action dated Jun. 11, 2008 for U.S. Appl. No. 10/723,805.
Office Action dated Feb. 3, 2009 for U.S. Appl. No. 10/723,805.
Final Office Action dated Aug. 5, 2009 for U.S. Appl. No. 10/723,805.
Office Action dated Apr. 27, 2010 for U.S. Appl. No. 10/723,805.
Restriction Requirement dated Oct. 25, 2010 for U.S. Appl. No. 10/723,805.
IDS dated Jun. 22, 2004 for U.S. Appl. No. 10/779,518.
IDS dated Dec. 8, 2004 for U.S. Appl. No. 10/779,518.

Cavers, James K. "An Analysis of Pilot Symbol Assisted Modulation for Rayleigh Fading Channels." IEEE Transactions on Vehicular Technology, vol. 40, No. 4, Nov. 1991, pp. 686-693.
IDS dated Dec. 15, 2004 for U.S. Appl. No. 10/779,518.
Restriction Requirement dated Jan. 9, 2007 for U.S. Appl. No. 10/779,518.
Office Action dated May 2, 2007 for U.S. Appl. No. 10/779,518.
IDS dated Jul. 2, 2004, for U.S. Appl. No. 10/800,791.
Harri Holma and Antti Toskala: "WCDMA for UMTS," John Wiley & Sons, Ltd. 2000 XP002278973, p. 123-p. 127.
Supplemental IDS dated Nov. 5, 2004 for U.S. Appl. No. 10/800,791.
Supplemental IDS dated Aug. 25, 2005 for U.S. Appl. No. 10/800,791.
Hosein P. et al: "On the tradeoff between throughput and fairness on the reverse link of a 3G CDMA network", Globecom '04. IEEE Global Telecommunications Conference (IEEE CAT. No, 04CH37615) IEEE Piscataway, NJ , USA, vol. 6, 2004, pp. 3850-3854 vol. XP002338914.
Office Action dated Feb. 16, 2007 for U.S. Appl. No. 10/800,791.
Final Office Action dated Nov. 28, 2007 for U.S. Appl. No. 10/800,791.
Office Action dated Apr. 10, 2008 for U.S. Appl. No. 10/800,791.
Notice of Allowance mailed Aug. 8, 2008 for U.S. Appl. No. 10/800,791.
Office Action dated Jul. 25, 2007 for U.S. Appl. No. 10/755,104.
Final Office Action dated Jan 9, 2008 for U.S. Appl. No. 10/755,104.
Advisory Action dated Apr. 17, 2008 for U.S. Appl. No. 10/755,104.
Office Action dated Jan. 4, 2007 for U.S. Appl. No. 10/719,811.
Final Office Action dated Jun. 18, 2007 for U.S. Appl. No. 10/719,811.
Advisory Action dated Oct. 3, 2007 for U.S. Appl. No. 10/719,811.

* cited by examiner

COMMUNICATING A BROADCAST MESSAGE TO CHANGE DATA RATES OF MOBILE STATIONS

CROSS-REFERENCE TO RELATED APPLICATION

This claims the benefit under 35 U.S.C. §119(e) of U.S. Provisional Application Ser. Nos. 60/454,714, filed Mar. 15, 2003; 60/457,215, filed Mar. 25, 2003; 60/459,534, filed Apr. 1, 2003; 60/462,220, filed Apr. 11, 2003; 60/468,442, filed May 6, 2003; 60/469,106, filed May 9, 2003; 60/469,778, filed May 12, 2003; 60/475,440, filed Jun. 3, 2003; 60/478,792, filed Jun. 16, 2003; 60/495,544, filed Aug. 15, 2003; and 60/499,584, filed Sep. 2, 2003.

This is a continuation-in-part of U.S. Ser. No. 10/793,056, entitled "AUTONOMOUS MODE TRANSMISSION FROM A MOBILE STATION," filed Mar. 4, 2004, which claims the benefit under 35 U.S.C. §119(e) of U.S. Provisional Application Ser. Nos. 60/452,370, filed Mar. 6, 2003; 60/454,714, filed Mar. 15, 2003; 60/457,215, filed Mar. 25, 2003; 60/459,534, filed Apr. 1, 2003; 60/462,220, filed Apr. 11, 2003; 60/468,442, filed May 6, 2003; 60/469,106, filed May 9, 2003; 60/469,778, filed May 12, 2003; 60/475,440, filed Jun. 3, 2003; 60/478,792, filed Jun. 16, 2003; 60/495,544, filed Aug. 15, 2003; and 60/499,584, filed Sep. 2, 2003.

Each of applications referenced above is hereby incorporated by reference.

TECHNICAL FIELD

This invention relates generally to communicating a broadcast message over a wireless link to change data rates of mobile stations.

BACKGROUND

A mobile communications network is typically made up of a plurality of cells. Each cell includes a radio base station, with each base station connected to a mobile switching center or a packet service node that manages communications sessions between mobile stations and terminals coupled to a public switched telephone network (PSTN) or a packet-based data network. Communications between mobile stations and base stations are performed over wireless links.

Traditional wireless protocols provide for circuit-switched communications. Such protocols include time-division multiple access (TDMA) protocols and code-division multiple access (CDMA) protocols. In a circuit-switched network, a channel portion between two endpoints (e.g., two mobile stations) is occupied for the duration of the connection between the endpoints.

However, with the wide availability of the Internet and intranets, packet-switched communications (e.g., web browsing, electronic mail, and so forth) have become more common. Generally, a circuit-switched connection is an inefficient mechanism for communicating packet data. As a result, third generation (3G) and beyond wireless technologies are being developed and implemented to provide higher bandwidth and more efficient packet-switched communications (of data as well as voice and other forms of real-time data) over wireless networks.

One example of a packet-switched wireless technology is defined by the CDMA 2000 family of standards, developed by the Third Generation Partnership Project 2 (3GPP2). A CDMA 2000 wireless communications network is capable of supporting both circuit-switched services and packet-switched services. For TDMA, packet-switched wireless communications protocols have also been developed, such as the Enhanced General Packet Radio Service (EGPRS) protocol as defined by the 3GPP (Third Generation Partnership Project) UMTS (Universal Mobile Telecommunications System) Release 1999 Standard, and others.

Conventionally, transmission of packet data by a mobile station over a reverse traffic channel, such as the reverse supplemental channel (R-SCH) of a CDMA 2000 wireless communications network, is scheduled by a scheduler in the base station. If loading becomes too heavy on the reverse wireless link, the scheduler adjusts assigned resources of mobile stations to reduce loading of the reverse wireless link. Traditionally, adjusting assigned resources of mobile stations requires that the base station send messages to each of the mobile stations, which is a time intensive procedure that also consumes valuable air interface bandwidth.

SUMMARY

In general, according to one embodiment, a method for use in a wireless communications network includes communicating data with plural mobile stations over a wireless link. A broadcast message is sent to the plural mobile stations, with the broadcast message containing an indication for indicating to the plural mobile stations that the mobile stations are to change data rates for transmissions over a reverse wireless link.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
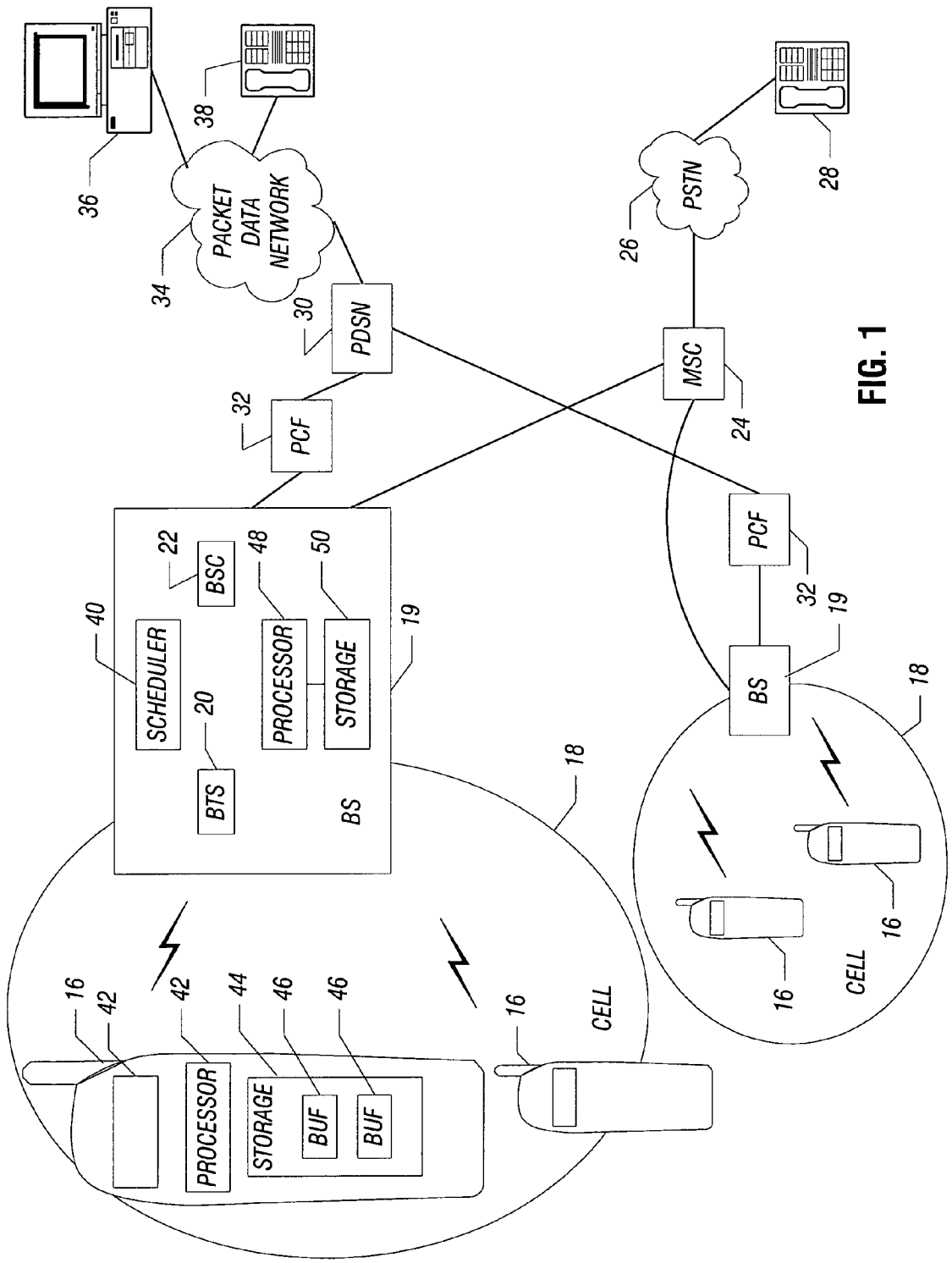
FIG. 1 is a block diagram of an example arrangement of a mobile or wireless communications network that incorporates an embodiment of the invention.

Referring to FIG. 1, a wireless or mobile communications network according to one embodiment includes components that operate according to CDMA (code-divisional multiple access) 2000. CDMA 2000 is defined by the CDMA 2000 family of standards (including the TIA-2000 standards, TIA-2001 standards, and the TIA-2000-D standards). However, in other embodiments, other types of wireless protocols can be used for communications in the wireless communications network, including other versions of CDMA, TDMA protocols, UMTS (Universal Mobile Telecommunications System) protocols, and other protocols.

The wireless communications network includes multiple cells 18, each including a base transceiver subsystem (BTS)

20 for performing radio telecommunications with mobile stations within the coverage area of the cell 18. The BTS entities 20 are connected to one or more base station controllers (BSCs) 22. Collectively, a BTS 20 and BSC 22 are referred to as a "base station" 19. More generally, a "base station" refers to any entity (or collection of entities) that communicates wirelessly with mobile stations and that exchanges control signaling with the mobile stations for establishing, terminating, or otherwise managing communication sessions (e.g., circuit-switched call sessions, packet-switched voice call sessions, other packet-switched communications sessions, and so forth). Note that, in some implementations, multiple BTSs can be connected to each BSC.

For communicating circuit-switched voice traffic, the base station 19 is coupled to a mobile switching center (MSC) 24, which is responsible for switching mobile station-originated or mobile station-terminated circuit-switched traffic. Effectively, the MSC 24 is the interface for signaling and user traffic between the wireless network and other public switched networks (such as a public switched telephone network (PSTN) 26) or other MSCs. The PSTN 26 is connected to landline terminals, such as telephones 28.

In a voice call session between a mobile station (such as mobile station 16) and a landline terminal (such as telephone 28), voice traffic is routed through the air interface between the mobile station 16 and a base station 14, and through the base station 14, MSC 24, and PSTN 26.

The wireless communications network also supports packet data services, in which packet data is communicated between a mobile station and another endpoint, which can be a terminal coupled to a packet data network 34 or another mobile station that is capable of communicating packet data. Examples of the packet data network 34 include private networks (such as local area networks or wide area networks) and public networks (such as the Internet). Packet data is communicated in a packet-switched communications session established between the mobile station and the other endpoint.

To communicate packet data, the base station 19 is coupled to a packet control function (PCF) module 32, which manages the relay of packets between the BSC 22 and a packet data serving node (PDSN) 30. The BSC 22 and PCF module 32 can be implemented on one platform or on multiple platforms. A "platform" generally refers to an assembly of hardware and software that provides predefined tasks.

The PDSN 30 establishes, maintains, and terminates link layer sessions to mobile stations, and routes mobile station-originated or mobile station-terminated packet data traffic. The PDSN 30 is coupled to the packet data network 34, which is connected to various endpoints, such as a computer 36 or a network telephone 38 (which is a telephone that is fitted with a network interface card for communications over packet data networks). Examples of packet-switched communications include web browsing, electronic mail, text chat sessions, file transfers, interactive game sessions, voice-over-IP (Internet Protocol) sessions, and so forth.

The wireless communications network thus provides two different types of communications: circuit-switched communications and packet-switched communications. Circuit-switched communications are routed through the MSC 24, while packet-switched communications are routed through the PDSN 30. In circuit-switched communications, a dedicated end-to-end channel is established for the duration of a call session. However, packet-switched communications utilize a connectionless intranetwork layer, such as that defined by the Internet Protocol (IP). In packet-switched communications, packets or other units of data carry routing information (in the form of network addresses) that are used to route the packets or data units over one or more paths to a destination endpoint.

One version of IP, referred to as IPv4, is described in Request for Comments (RFC) 791, entitled "Internet Protocol," dated September 1981; and another version of IP, referred to as IPv6, is described in RFC 2460, "Internet Protocol, Version 6 (IPv6) Specification," dated December 1998.

In the ensuing discussion, reference is made to the transmission of packet data by a mobile station. However, note that techniques according to some embodiments of the invention can also be applied to circuit-switched communications.

The base station 19 includes a scheduler 40 to schedule (in scheduled mode) transmission of data by the mobile stations 16 over the respective reverse wireless links. Note that the scheduler 40 can be implemented in either the BTS 20 or the BSC 22, or both. In scheduling a mobile station for transmitting packet data, the scheduler 40 specifies a data rate, a start time, and duration through either layer 2 signaling or layer 3 signaling messages. If scheduled, a mobile station 16 is able to transmit data (such as data in buffers 46 of a storage 44), including packet data, according to the specifications provided by the scheduler 40. This type of transmission by mobile stations is referred to as scheduled mode transmission.

In scheduled mode, a grant message (which is a layer 2 message according to an embodiment) is sent in a forward grant channel (F-GCH) by the base station 19 to a mobile station 16 to assign a data rate at which the mobile station is to transmit packet data on a reverse packet data channel (R-PDCH). R-PDCH is used for transmitting packet data from the mobile station to the base station over the reverse wireless link. The forward grant channel is a relatively quick mechanism for assigning the data rate of the mobile station on R-PDCH.

The grant message can be targeted to a specific mobile station such that data rate assignment can be performed on an individual mobile station basis. In accordance with some embodiments of the invention, the grant message can also be targeted at multiple mobile stations served by a base station to cause the multiple mobile stations to change data rates. When targeted at multiple mobile stations served by a base station, the grant message is considered to be a "broadcast" message. In this latter configuration, the grant message contains a special indicator referred to as a "broadcast indication." As used here, the term "broadcast indication" refers to the transmission of an indication that is targeted to a group of two or more mobile stations that are served by a base station.

By using one broadcast message to control data rates of multiple mobile stations, data rate adjustment for managing the loading of the reverse wireless link between mobile stations and the base station can be performed much more quickly and with fewer messages exchanged between the base station and mobile stations. By employing this mechanism, the base station does not have to successively send individual messages to mobile stations to change data rates of the mobile stations, which can be a time intensive process.

Thus, in one configuration, a grant message sent on a forward grant channel can assign a specific data rate to a targeted mobile station for communication of packet data on R-PDCH. In another configuration, the grant message sent on the forward grant channel, instead of assigning a specific data rate to an individual mobile station, sets a broadcast indication that is targeted to all mobile stations served by a base station to change data rates of the mobile stations.

The broadcast indication in the grant message causes each mobile station to adjust its data rate to less than or equal to a maximum autonomous data rate. Instead of scheduled mode transmission, mobile stations 16 are also capable of transmitting packet data over R-PDCH in autonomous mode. The types of data transmissions that can benefit from autonomous mode transmission include data traffic that is delay-sensitive and stream-like (rather than bursty). For example, interactive gaming sessions over a packet data network involve streaming data that is delay-sensitive. Other types of data transmissions that can benefit from autonomous mode transmission include low-rate signaling traffic. Note, however, that autonomous mode transmission over a reverse wireless link is not to be limited to only the traffic mentioned above, but rather can be applied to any type of traffic.

In autonomous mode, a mobile station 16 containing data to transmit does not have to wait for the scheduler 40 in the base station 19 to schedule a reverse channel for the mobile station 16. Instead, the mobile station 16 is able to autonomously send data over the reverse wireless link at a data rate that is less than or equal to a specified maximum autonomous data rate. Effectively, in autonomous mode, the mobile station 16 is able to transmit packet data at a data rate up to the maximum autonomous data rate without an explicit, scheduled rate assignment received in the forward grant channel from the scheduler 40 in the base station 19.

The forward grant channel is a shared channel that is monitored by all mobile stations that have been enabled to transmit data on R-PDCH. The forward grant channel includes an identifier to uniquely identify each mobile station. In one implementation, the identifier is in the form of a medium access control (MAC) identifier, referred to as "MAC ID." The MAC layers in the base station and mobile station control the access signaling (request and grant) procedures for the air interface.

According to some embodiments of the invention, the grant message on the forward grant channel includes two fields: a MAC ID field containing the identifier of the mobile station; and a data rate assignment field that specifies the data rate of the targeted mobile station. To assign a specific data rate to a targeted mobile station, the MAC ID field in the grant message is set to a value to uniquely identify the mobile station to which the data rate assignment information is directed. Alternatively, the MAC ID field can be set to a predetermined value to provide the broadcast indication discussed above. The broadcast indication is an indication to all mobile stations enabled to operate on R-PDCH that the mobile stations are to set their data rates to less than or equal the maximum autonomous data rate. In one example implementation, the MAC ID field is set to the binary value 00000000 to provides the broadcast indication. In other implementations, other predetermined values of MAC ID can be used to provide the broadcast indication.

More generally, instead of setting the MAC ID field of the grant message to provide the broadcast indication, other fields in the grant message can be employed, such as the data rate assignment field or another field.

Figure 2:
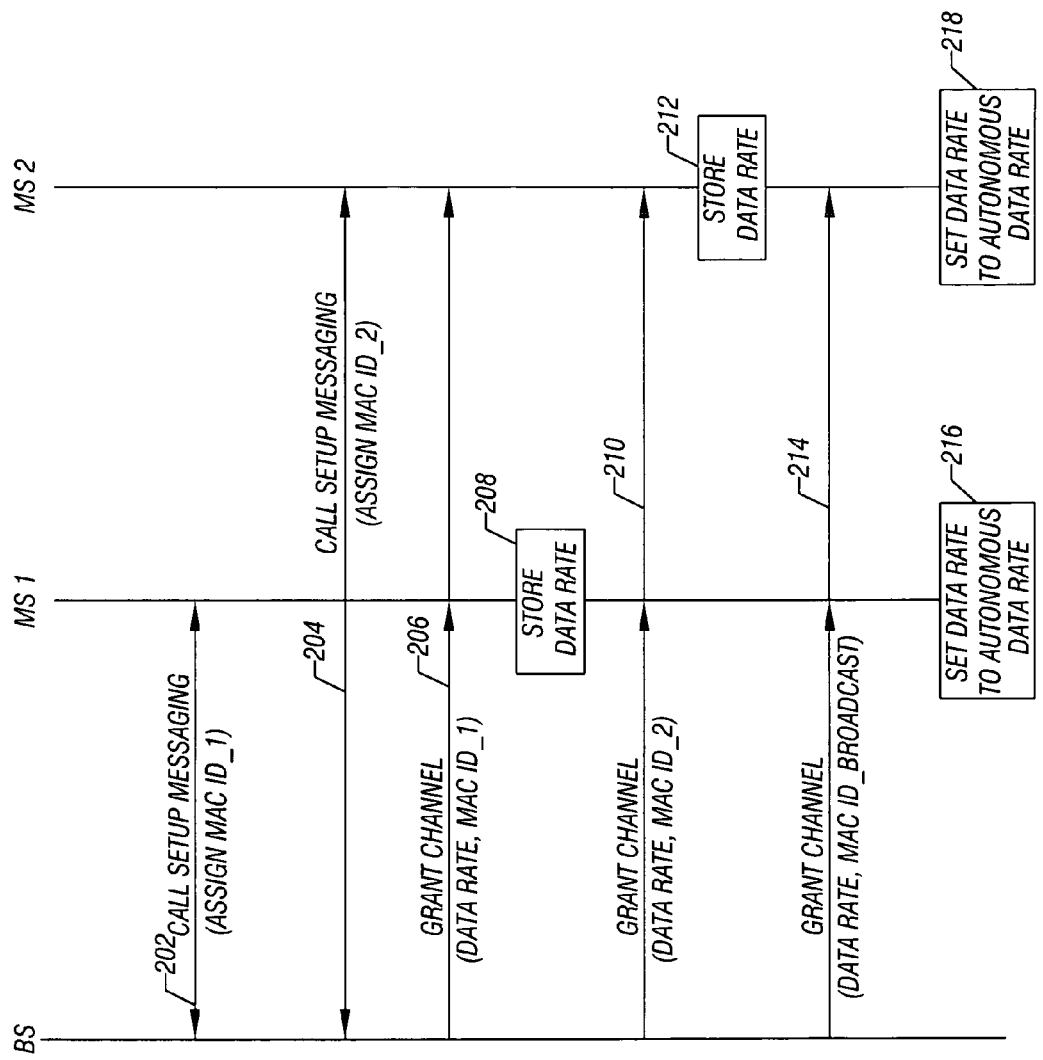
FIG. 2 is a message flow diagram of a procedure for setting data rates of mobile stations, in accordance with an embodiment of the invention.

FIG. 2 is a message flow diagram that illustrates the communication of signaling among a base station, a first mobile station (MS 1), and a second mobile station (MS 2). Call setup messaging is exchanged (at 202) between the base station 19 and MS 1. As part of call setup, the base station assigns a specific MAC ID value to MS 1, in this example MAC ID_1.

Call setup messaging is also exchanged (at 204) between the base station and MS 2, in which the base station assigns a MAC ID value to MS 2, in this example MAC ID_2. In an alternative embodiment, instead of assigning a MAC ID value during call setup, the base station can assign a MAC ID value to a mobile station while the mobile station is in an active state by using other messaging, such as a Universal Handoff Direction Message (UHDM), or another message.

Later, the base station sends a grant message (at 206) on the forward grant channel that is shared by multiple mobile stations, including MS 1 and MS 2. The grant message sent at 206 specifies data rate assignment information and a MAC ID field having value MAC ID_1. In other words, the grant message sent at 206 is targeted to MS 1. In response to the grant message sent at 206, MS 1 stores (at 208) the assigned data rate communicated in the grant message. This assigned data rate is used by MS 1 to communicate packet data on R-PDCH during scheduled mode transmission.

Subsequently, the base sends another grant message (at 210) on the shared forward grant channel. In this case, the grant message contains data rate assignment information and a MAC ID field having value MAC ID_2. This grant message is targeted to MS 2. In response to the grant message sent at 210, MS 2 stores (at 212) the assigned data rate. This assigned data rate is used by MS 2 to communicate packet data on R-PDCH. Note that the base station can assign different data rates to different mobile stations in the grant messages.

Later, the scheduler 40 in the base station 19 may detect that there is excessive loading on the reverse wireless link (in particular, loading on R-PDCH). To reduce the loading, the base station sends (at 214) a grant message on the shared forward grant channel, with the grant message containing a MAC ID field having value MAC ID_Broadcast. The value MAC ID_Broadcast is a broadcast indication to MS 1 and MS 2 (as well as other mobile stations enabled on R-PDCH and served by the base station) to change data rates in each of MS 1 and MS 2 (at 216 and 218) to less than or equal to the maximum autonomous data rate. After this, packet data to be transmitted by MS 1 or MS 2 on R-PDCH is at a data rate that is less than or equal to the maximum autonomous data rate specified for the mobile station. The base station can later send additional grant messages to specify data rates of respective mobile stations.

In the embodiments described above, the grant message contains one special broadcast indication. In other embodiments, multiple special indications can be provided by assigning other values of MAC ID for corresponding special indications. For example, another predetermined value of MAC ID can be used to indicate another function, such as to assign a particular data rate or maximum autonomous data rate to multiple mobile stations, or to increment or decrement data rates or maximum autonomous data rates of multiple mobile stations.

The broadcast grant message can also be used to serve a subset of mobile stations within a cell. Multiple predetermined MAC_ID values can be specified for different groups of mobile stations within a cell. For example, a first MAC_ID value targets a first group of plural mobile stations, a second MAC_ID value targets a second group of plural mobile stations, and so forth.

The various tasks of FIG. 2 discussed above, including the tasks of communicating (transmitting or receiving) messages or parameters, and so forth, are executable by components of either the base station or mobile station. For example, the mobile station may include a chipset (made up of a processor, and/or microcontroller, and other associated components) for performing the communication and other tasks.

A quick mechanism is provided to enable a base station to change data rates of mobile stations enabled to transmit on R-PDCH. The ability to send a broadcast indication to change data rates of mobile stations reduces the amount of signaling that has to be exchanged between the base station and mobile stations, and thus increases the speed at which the base station can control data rates of the mobile stations. Also, less bandwidth is consumed in the air interface for control messaging relating to data rate assignment.

The following provides a more detailed explanation of the autonomous mode of operation according to some implementations.

The maximum autonomous data rate is specified by an indicator (in the form of a parameter) sent by the base station 19 to the mobile station 16. According to one implementation, the parameter is named REV_PDCH_MAX_AUTO_TPR$_s$, which refers to the maximum autonomous traffic-to-pilot ratio (TPR) on R-PDCH. The traffic-to-pilot ratio is used by the mobile station to calculate a corresponding data rate. A higher traffic-to-pilot ratio implies a higher data rate.

Each mobile station 16 can be assigned a different REV_PDCH_MAX_AUTO_TPR$_s$ parameter. This enables the base station 19 to assign different maximum autonomous data rates to different mobile stations 16, if desired.

Another parameter that is sent from the base station 19 to the mobile station 16 regarding the autonomous mode of transmission is a flag to indicate whether autonomous mode is enabled. In one implementation, the flag is named REV_PDCH_AUTO_ALLOWED$_s$[i], where i is a service reference identifier (sr_id) to identify a service for which data is to be transmitted by the mobile station. For example, packet data that can be communicated by a mobile station 16 include packet data for a voice-over-IP service, a web browsing service, an e-mail service, a text chat service, a file download service, an interactive gaming service, and so forth. Multiple concurrent communications sessions for respective services can be set up by the mobile station 16. For each such service having a reference identifier sr_id$_x$, the state of REV_PDCH_AUTO_ALLOWED$_s$[sr_id$_x$] is set (to logical "1" to indicate that autonomous mode transmission is enabled for the service having reference identifier sr_id$_x$, and to logical "0" to indicate that autonomous mode transmission is disabled for the service having reference identifier sr_id$_x$). Thus, for example, autonomous mode may be enabled for an interactive gaming session, where the communication of data is relatively delay sensitive. On the other hand, autonomous mode may be disabled for a file download session or web browsing session, since these types of data communications are less delay sensitive.

The base station 19 is able to send autonomous mode parameters, including REV_PDCH_MAX_AUTO_TPR$_s$ and REV_PDCH_AUTO_ALLOWED$_s$[i], in various messages, which can be sent during a call setup procedure or at other times (such as after a call has been established and the mobile station is in an active state). According to one implementation, examples of such messages include an Extended Channel Assignment Message for assigning a channel to a mobile station. Another message is a Service Connect Message (SCM), sent to establish a service instance either at call setup or during a call. Another message that can carry the autonomous mode parameters mentioned above is a Universal Handoff Direction Message (UHDM), which is sent at any time during a call. In other implementations, other messages can be employed to carry the autonomous mode parameters. Such messages are sent in the forward wireless link from the base station to the mobile station.

Figure 3:
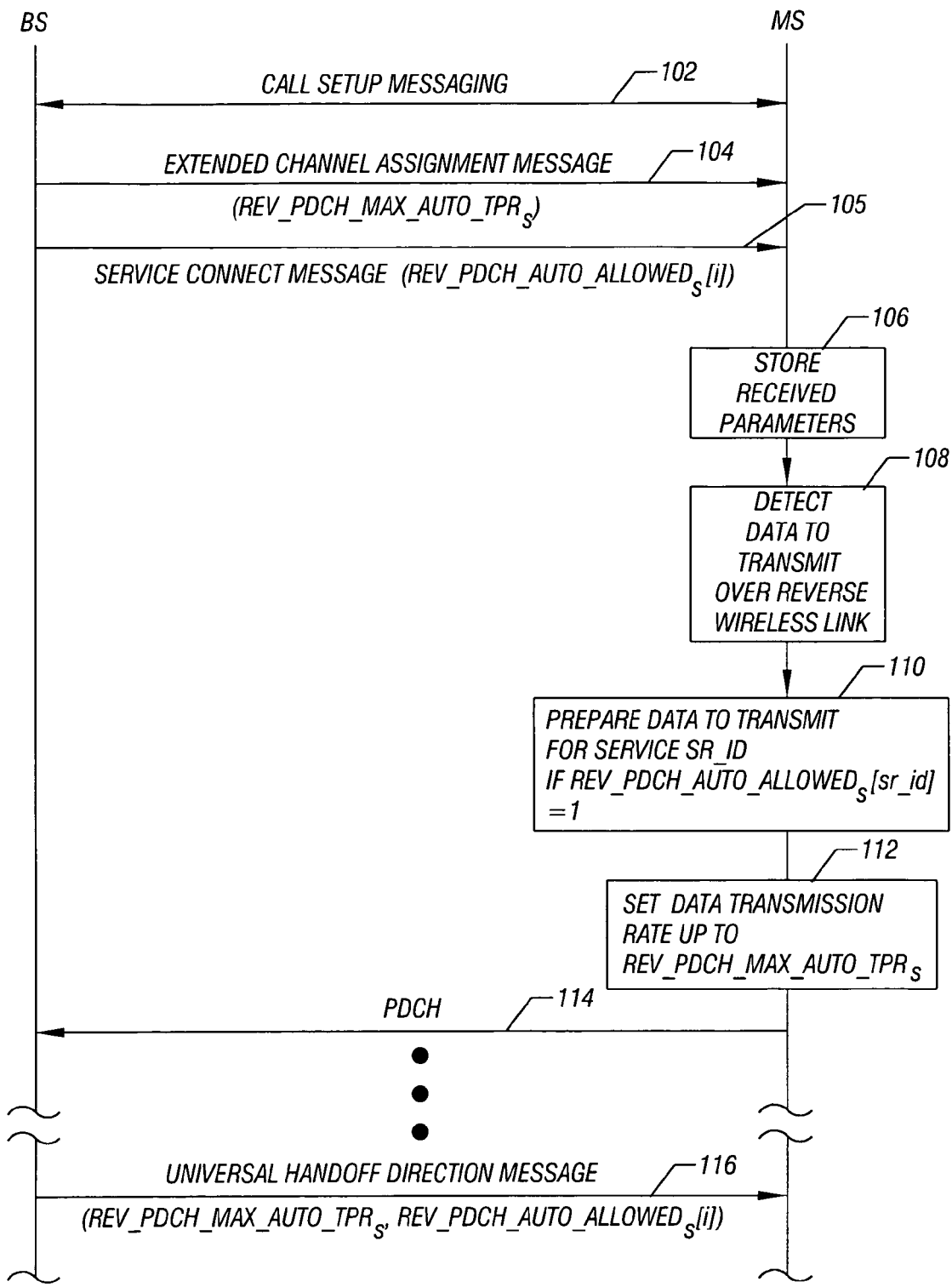
FIG. 3 is a message flow diagram of a procedure for enabling autonomous communication of data from the mobile station to the base station at a rate up to a maximum autonomous data rate, in accordance with an embodiment of the invention.

FIG. 3 illustrates a message flow diagram involving a base station and mobile station. Call setup messaging is initially exchanged (at 102) between the base station and the mobile station to establish a call. As part of call setup, the base station send (at 104) an Extended Channel Assignment Message, which includes the REV_PDCH_MAX_AUTO_TPR$_s$ message. Also, the base station sends (at 105) a Service Connect Message (SCM) to the mobile station. The Service Connect Message includes REV_PDCH_AUTO_ALLOWED$_s$[i]. Note that the Service Connect Message can also be transmitted from the base station to the mobile station after call setup has completed. This is usually performed to establish new service instances (to provide additional services) between the mobile station and the base station. Call setup need only be performed once, with the mobile station being able to provide multiple services in one call session.

In other implementations, the REV_PDCH_MAX_AUTO_TPR$_s$ and REV_PDCH_AUTO_ALLOWED$_s$[i] messages can both be carried in the Extended Channel Assignment Message or in the Service Connect Message.

The received autonomous mode parameters are stored (at 106) by the mobile station 16. The mobile station 16 next detects (at 108) that it has packet data to transmit over the reverse wireless link. Packet data to be transmitted is stored in the buffers 46 (FIG. 1) of the mobile station 16. If the mobile station has established multiple sessions for multiple corresponding services, then the buffers 46 would contain packet data for the multiple sessions.

For each service having a corresponding service reference identifier sr_id$_x$, if REV_PDCH_AUTO_ALLOWED$_s$[sr_id$_x$] has the logical "1" state, then packet data for that service is prepared for transmission (at 110) by the mobile station. The data transmission rate is set (at 112) at a rate up to REV_PDCH_MAX_AUTO_TPR$_s$. Note that the data rate that the mobile station actually transmits at can be limited by the status of the buffers (referred to as a buffer-limited data rate) or by power headroom (referred to as a power-limited data rate). The data is then sent (at 114) over a reverse packet data channel (R-PDCH). While the mobile station remains in its active state, the base station can send (116) additional messages to the mobile station to either change the value of REV_PDCH_MAX_AUTO_TPR$_s$ and REV_PDCH_AUTO_ALLOWED$_s$[i] for an existing service, or to set the value of REV_PDCH_MAX_AUTO_TPR$_s$ and REV_PDCH_AUTO_ALLOWED$_s$[i] for new services. As noted above, one such message is the Service Connect Message. Alternatively, the base station can send a Universal Handoff Direction Message (UHDM) to the mobile station, which is typically performed during a handoff procedure when the mobile station travels from one cell (or cell sector) to another cell (or cell sector).

In a different implementation, another message can be used to change the values of REV_PDCH_MAX_AUTO_TPR$_s$ and REV_PDCH_AUTO_ALLOWED$_s$[i]. For example, a message can be sent by the base station to the mobile station to increment or decrement the value of REV_PDCH_MAX_AUTO_TPR$_s$ by a predetermined amount. Another message can also be sent by the base station to the mobile station for toggling the state of REV_PDCH_AUTO_ALLOWED$_s$[i].

Instructions of the various software modules discussed herein (such as the scheduler 40 and other software executable in base station 19 or mobile station 16) are loaded for execution on corresponding control units or processors, such as a processor 42 (FIG. 1) in the mobile station and a processor 48 in the base station 19. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software modules) are stored in one or more machine-readable storage media, such as storage 44 (FIG. 1) in the mobile station 16 and storage 50 in the base station 19. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to a system in one of many different ways. For example, code segments including instructions stored on floppy disks, CD or DVD media, a hard disk, or transported through a network interface card, modem, or other interface device are loaded into the system and executed as corresponding software routines or modules. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a wireless communications network, comprising:
   communicating data to plural mobile stations over a wireless link; and
   sending a broadcast message to the plural mobile stations, the broadcast message containing an indication for indicating to the plural mobile stations that the mobile stations are to change data rates for transmissions over a reverse wireless link, wherein the broadcast message further includes a particular data rate that is to be used by the plural mobile stations over the reverse wireless link.

2. The method of claim 1, wherein sending the broadcast message comprises sending a grant message on a channel that is monitored by the plural mobile stations.

3. The method of claim 2, wherein sending the grant message on the channel comprises sending the grant message on a forward grant channel according to code-division multiple access (CDMA) 2000.

4. The method of claim 2, wherein sending the grant message comprises sending a grant message containing an identifier, the identifier settable to a first value to uniquely identify one of the plural mobile stations, and the identifier settable to a predetermined value to provide a broadcast indication for indicating to the plural mobile stations that the mobile stations are to change data rates for transmissions over the reverse wireless link.

5. The method of claim 4, wherein the identifier comprises a medium access control (MAC) identifier (MAC ID), the method further comprising:
   setting the MAC ID of the grant message to the first value to target a first one of the plural mobile stations; and
   setting the MAC ID of the grant message to the predetermined value to provide the broadcast indication to the plural mobile stations.

6. The method of claim 5, wherein setting the MAC ID to the predetermined value comprises setting the MAC ID to a binary value 00000000.

7. The method of claim 2, wherein sending the grant message comprises sending a grant message containing a data rate assignment field and an identifier field, wherein the data rate assignment field contains the particular data rate, and the identifier field contains the indication.

8. The method of claim 7, wherein the channel is a shared channel monitored by each of the plural mobile stations, the method further comprising sending another grant message having a value of the identifier field set to uniquely identify one of the mobile stations such that the one mobile station is able to receive an assigned data rate in the data rate assignment field of the another grant message.

9. The method of claim 1, wherein sending the broadcast message to the plural mobile stations comprises sending the broadcast message containing the indication for indicating to the plural mobile stations that the mobile stations are to change data rates for transmissions of packet data over respective reverse packet data channels.

10. A method for use in a wireless communications network, comprising:
    communicating data to plural mobile stations over a wireless link; and
    sending a broadcast message to the plural mobile stations, the broadcast message containing an indication for indicating to the plural mobile stations that the mobile stations are to change data rates for transmissions over a reverse wireless link, wherein sending the broadcast message to the plural mobile stations comprises sending the broadcast message to cause the plural mobile stations to set respective data rates to a value less than or equal to an autonomous data rate of each of the corresponding mobile stations, wherein the autonomous data rate is useable by the corresponding mobile station operating in autonomous mode in which the corresponding mobile station is able to transmit data over the reverse wireless link without being scheduled.

11. A computer circuit comprising at least one non-transitory storage medium containing instructions that when executed cause a system in a wireless communications network to:
    communicate data to plural mobile stations over a wireless link; and
    send a grant message to the plural mobile stations, the grant message containing an identifier, the identifier set to a first value to uniquely identify one of the plural mobile stations that is to change data rate for transmissions over a reverse wireless link, and the identifier set to a predetermined value to provide a broadcast indication for indicating to the plural mobile stations that the mobile stations are to change data rates for transmissions over a reverse wireless link.

12. The computer circuit of claim 11, wherein sending the grant message comprises sending the grant message on a forward grant channel (F-GCH) in a code-division multiple access (CDMA) 2000 wireless communications network.

13. The computer circuit of claim 11, wherein sending the grant message containing the broadcast indication is for indicating to the plural mobile stations that the mobile stations are to change data rates for transmissions of packet data over respective reverse channels.

14. The computer circuit of claim 11, wherein sending the grant message containing the broadcast indication is for assigning a particular data rate to each of the plural mobile stations, the particular data rate relating to transmissions of packet data over respective reverse channels.

15. The computer circuit of claim 11, wherein sending the grant message containing the broadcast indication is for incrementing or decrementing data rates of the plural mobile stations for transmissions of packet data over respective reverse channels.

16. A mobile station comprising:
an interface to receive messages from a base station, the messages comprising a broadcast message targeted to plural mobile stations, wherein the broadcast message contains a data rate assignment field that contains a particular data rate to be used by the plural mobile stations over a reverse wireless link; and
a controller to change a data rate of transmission over the reverse wireless link to the particular data rate specified by the broadcast message.

17. The mobile station of claim 16, wherein the controller is adapted to change the data rate of transmission over a reverse packet data channel.

18. The mobile station of claim 17, wherein the reverse packet data channel is a code-division multiple access (CDMA) 2000 reverse packet data channel (R-PDCH).

19. The mobile station of claim 16, wherein the interface is adapted to receive the broadcast message on a forward grant channel, the forward grant channel being a shared channel for monitoring by plural mobile stations.

20. A mobile station comprising:
an interface to receive broadcast messages from a base station transmitted to plural mobile stations, said broadcast message including an identifier that can be set to a first value to uniquely identify a specific mobile station, or a predetermined value that provides a broadcast indication; and
a controller to change a data rate of transmission over a reverse wireless link in response to the broadcast message, said controller configured to change the data rate of transmission to be less than or equal to an autonomous data rate when:
the identifier in the broadcast message is set to the predetermine value that provides a broadcast indication; or
when the identifier in the broadcast message is set to the first value to uniquely identify a specific mobile station and the mobile station is the specific mobile station being uniquely identified.

21. The mobile station of claim 20, wherein the interface is adapted to receive another message from the base station that sets the autonomous data rate.

22. A base station comprising:
a subsystem to communicate data to plural mobile stations over a wireless link; and
a processor to send a broadcast message to the plural mobile stations, the broadcast message containing an indication for indicating to the plural mobile stations that the mobile stations are to change data rates for transmissions over a reverse wireless link, wherein the broadcast message further includes a particular data rate that is to be used by the plural mobile stations over the reverse wireless link.

23. The base station of claim 22, wherein the broadcast message is a grant message on a channel that is monitored by the plural mobile stations.

24. The base station of claim 23, wherein the grant message contains an identifier, the identifier settable to a first value to uniquely identify one of the plural mobile stations, and the identifier settable to a predetermined value to provide a broadcast indication for indicating to the plural mobile stations that the mobile stations are to change data rates for transmissions over the reverse wireless link.

25. The base station of claim 22, wherein the grant message contains a data rate assignment field and an identifier field, wherein the data rate assignment field contains the particular data rate, and the identifier field contains the indication.

* * * * *